United States Patent [19]
Kojima

[11] Patent Number: 5,392,093
[45] Date of Patent: Feb. 21, 1995

[54] PHOTOGRAPHIC PRINTING APPARATUS

[75] Inventor: Masayuki Kojima, Wakayama, Japan

[73] Assignee: Noritsu Koki Co., Ltd., Wakayama, Japan

[21] Appl. No.: 181,439

[22] Filed: Jan. 14, 1994

[30] Foreign Application Priority Data

Jan. 18, 1993 [JP] Japan .................. 5-005726

[51] Int. Cl.6 ............................................. G03B 27/80
[52] U.S. Cl. ............................................ 355/38; 355/68
[58] Field of Search ..................................... 355/38, 68

[56] References Cited

U.S. PATENT DOCUMENTS

| | | | |
|---|---|---|---|
| 1,934,484 | 11/1933 | Camilli | 355/68 X |
| 1,946,612 | 2/1934 | Carter | 355/68 |
| 2,158,903 | 5/1939 | Knobel | 355/68 |
| 2,764,060 | 9/1956 | Horak | 355/68 |
| 3,034,400 | 5/1962 | Biedermann et al. | 355/68 |
| 3,672,768 | 6/1972 | Schaub et al. | 355/38 |
| 3,887,279 | 6/1975 | Rubin | 355/38 |
| 4,011,446 | 3/1977 | Swanberg | 250/201 |
| 4,371,259 | 2/1983 | Howitt | 355/38 |
| 4,492,457 | 1/1985 | Kawada et al. | 355/38 |
| 4,668,082 | 5/1987 | Terashita et al. | 355/77 |

OTHER PUBLICATIONS

Patent Abstracts of Japan, vol. 13, No. 463 (E-833) Oct. 19, 1989.
Patent Abstracts of Japan, vol. 16, No. 131 (P-1332) Apr. 3, 1992.

*Primary Examiner*—Richard A. Wintercorn
*Attorney, Agent, or Firm*—Wenderoth, Lind & Ponack

[57] ABSTRACT

A photographic printing apparatus having a single light source and a reflecting mirror. The mirror is provided between the light source and the light-modulating device having light-modulating filters, a mirror tunnel and diffusers and has a light-passing portion. Most part of the light from the light source is reflected by the mirror and used for exposing negative films after passing it through the light-modulating device. The remainder of the light from the light source passes through the light-passing portion and is used for scanning.

3 Claims, 3 Drawing Sheets

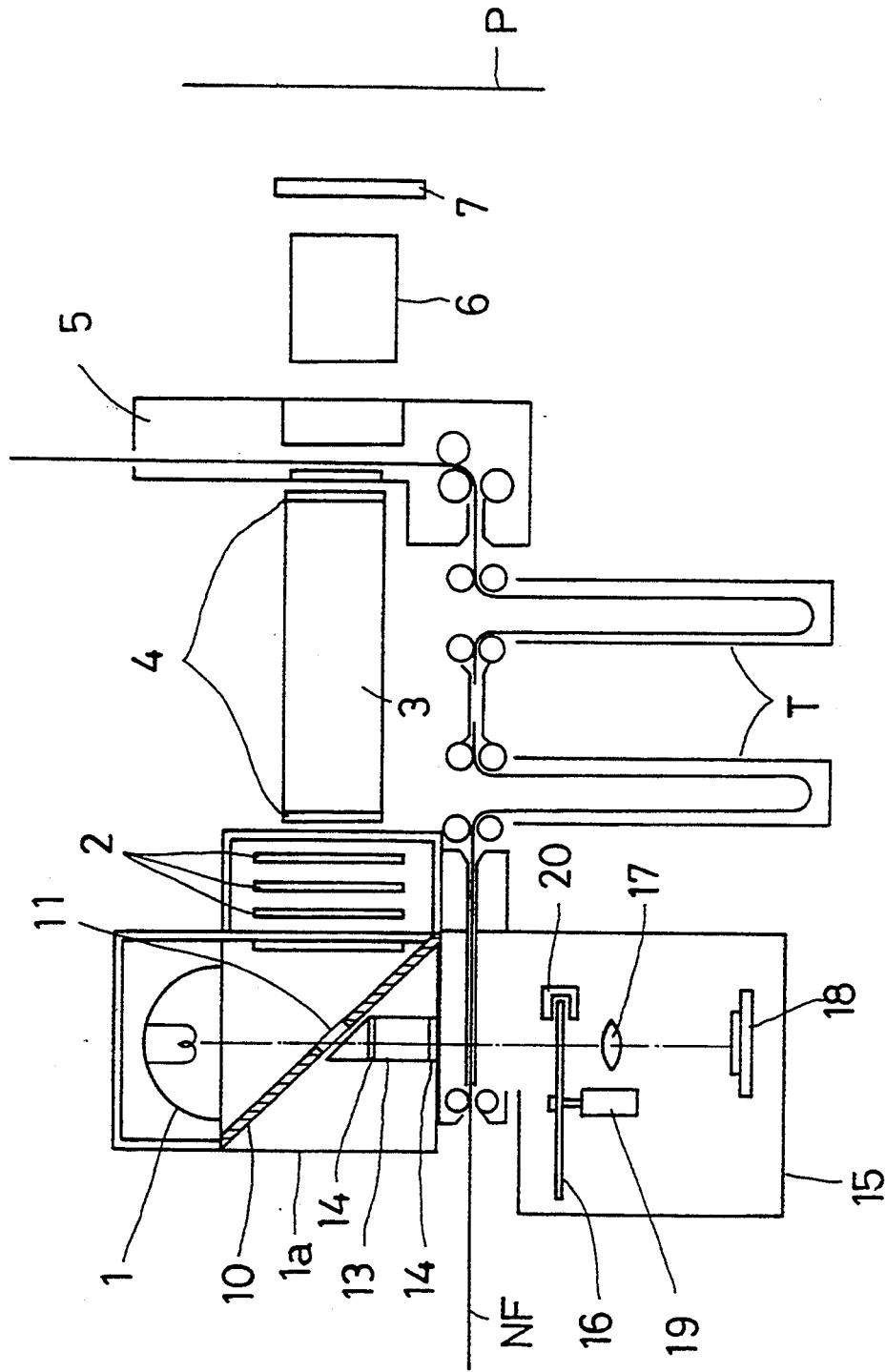

PHOTOGRAPHIC PRINTING APPARATUS

This invention relates to a photographic printing apparatus and more particularly to a reflecting member mounted in its light source unit for printing and exposure.

FIGS. 4A and 4B show conventional photographic printing apparatus. A light source unit used in such photographic printing apparatus has to have two functions, i.e. the function as a light source for a scanner unit for adjusting the intensity of light from the light source unit and the function as a light source for printing. The light source unit shown in FIG. 4A has a single light source that performs both of the functions, while the one shown in FIG. 4B has two light sources, each of which carry out the respective function.

The apparatus shown in FIG. 4A comprises a light source 1, light-modulating filters 2, a mirror tunnel 3, diffusers 4 provided in front and rear of the mirror tunnel 3, a negative mask 5, a lens 6 and a shutter 7. The image on a negative film NF is printed on paper P. The light from the light source passes through a hole 8 formed in the negative mask 5 into a scanner unit 9.

The apparatus shown in FIG. 4B has a scanner device provided separately from the printing apparatus. Each of the printing apparatus and the scanner device has its own light source 1s, mirror tunnel 3s and diffusers 4s. A carrier member K for feeding a negative film is formed with a hole 8s to guide light to a scanner unit 9s. Letter T indicates a loop tank for adjusting the feed rate of negative films.

Of these two conventional photographic printing apparatus, the former one having a single light source has a problem in that printing work has to be interrupted while the light source is being used for scanning, though there is no need to correct the negative information obtained by the scanner.

The latter printing apparatus having two light sources has a problem in that it is necessary to correct the negative information obtained by the scanner when printing, because the ray of light from the light source for printing and the ray from the light source for scanning differ from each other in various properties such as aging change and variations in the color components.

An object of this invention is to provide a photographic printing apparatus which makes it possible to use a single light source both as a light source for exposure and as a light source for scanning, which can reduce the cost of the printing apparatus and which can improve the efficiency of printing work.

According to the present invention, there is provided a photographic printing apparatus comprising a light source, a filter, a mirror tunnel, a diffuser, a lens, a shutter, and a scanner unit, characterized in that the apparatus further comprises a light reflecting member having a light-passing portion for reflecting part of the light from the light source to pass through the filter, mirror tunnel, diffuser, lens and shutter, the remaining of the light passing through the light reflecting member toward the scanner unit.

Such a light-passing portion may be a hole formed in the reflecting member or may be formed by partially removing or thinning a reflecting film formed on the reflecting member by vapor deposition.

By providing the reflecting member, the light from the light source can be divided into a light beam for exposure and a light beam for scanning. More specifically, most part of the light from the light source is reflected by the reflecting member and guided into an ordinary light-modulating unit comprising light-modulating filters, diffusers and a mirror tunnel.

The remaining part of the light passes through the light-passing portion formed in the reflecting member and is directed into the scanner device, where various properties of the light such as the intensity of light and the rate of color tones are determined. The properties of light thus obtained are used to control the light-modulating device when printing. Thus, a single light source can be used both for exposure and scanning.

The reflecting mirror according to this invention is provided between the light source and the light-modulating device. By providing such a reflecting mirror, a single light source can be used for two purposes. This greatly improves the efficiency of printing work.

Other features and objects of the present invention will become apparent from the following description made with reference to the accompanying drawings, in which:

FIG. 1 is a schematic view showing the entire structure of the photographic printing apparatus of the embodiment;

Figure 2A:
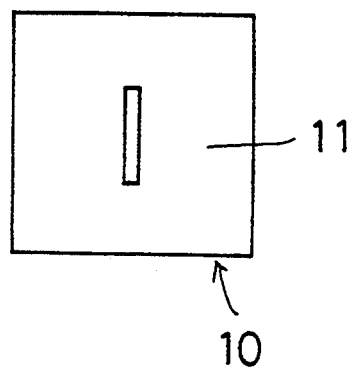
FIGS. 2A–2D are views of reflecting mirrors of different type.

Referring to FIG. 1, the photographic printing apparatus of this embodiment has its light source 1 arranged so that its optical axis is perpendicular to an optical axis that extends through light-modulating filters 2, a lens 6 and a shutter 7. The light from the light source 1 is bent by an angle of 90° by a reflecting mirror 10 provided in a light source box 1a.

The reflecting mirror 10 has a central light-passing portion 11. Part of the light around its optical axis passes through the light-passing portion 11 and is received by a scanner device 15. In the embodiment, the reflecting mirror 10 is inclined by an angle of 45 with respect to the optical axis of the light from the light source 1 so as to bend the light by 90. But the angle of inclination of the reflecting mirror 10 is not limited to 45 but may be determined at any other value provided the light directed to the scanner device is separable by the reflecting mirror 10.

Figure 2B:
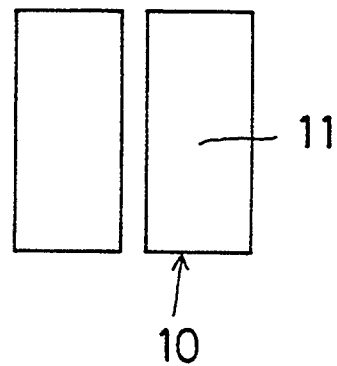
Figure 2C:
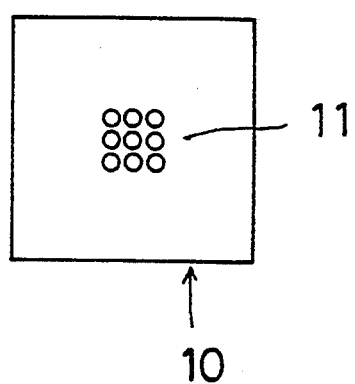
Figure 2D:
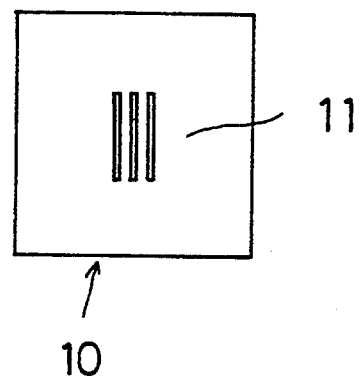

FIGS. 2A and 2D show light-passing portions 11 of different shapes formed in the reflecting mirror 10. The light-passing portion shown in FIG. 2A comprises a single rectangular hole (such a hole may be of circular or any other shape). FIG. 2B shows a light-passing portion in the form of a slit dividing the reflecting mirror into two separate parts. The one shown in FIG. 2C comprises a plurality of small holes while the one shown in FIG. 2D comprises a plurality of slits formed in the reflecting mirror.

Such a light-passing portion 11 may be formed by removing or thinning a corresponding part of the reflecting film vapor-deposited on the reflecting mirror or by actually forming a single hole or a plurality of holes or cutouts in the reflecting mirror.

The reflecting mirror of the embodiment may be replaced with a plate having its surface mirror-finished and made of a heat-resistant material such as plastic, a metal such as iron, stainless steel or aluminum, or ceramics.

Behind the reflecting mirror 10 is provided a mirror tunnel 13 having diffusers 14 at both ends thereof. It serves to direct the light from the light source 1 in a straight line to the scanner device 15, which comprises a scanner filter 16 carrying B (blue), G (green) and R (red) filters, a lens 17 and a photometric sensor 18. They are arranged along the optical axis.

Figure 3:
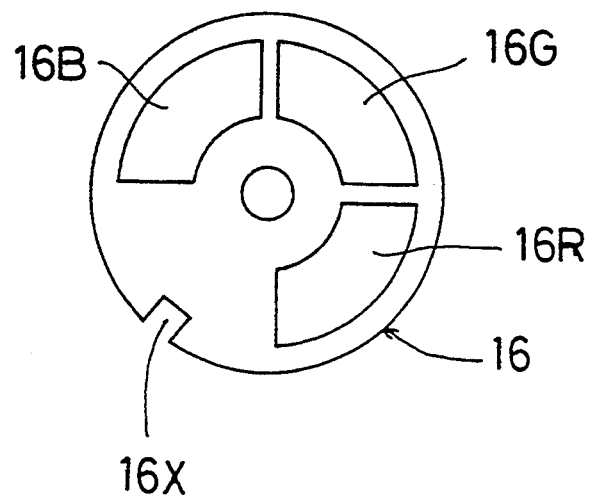
FIG. 3 is a view of the scanner filter unit.
Figure 4A:
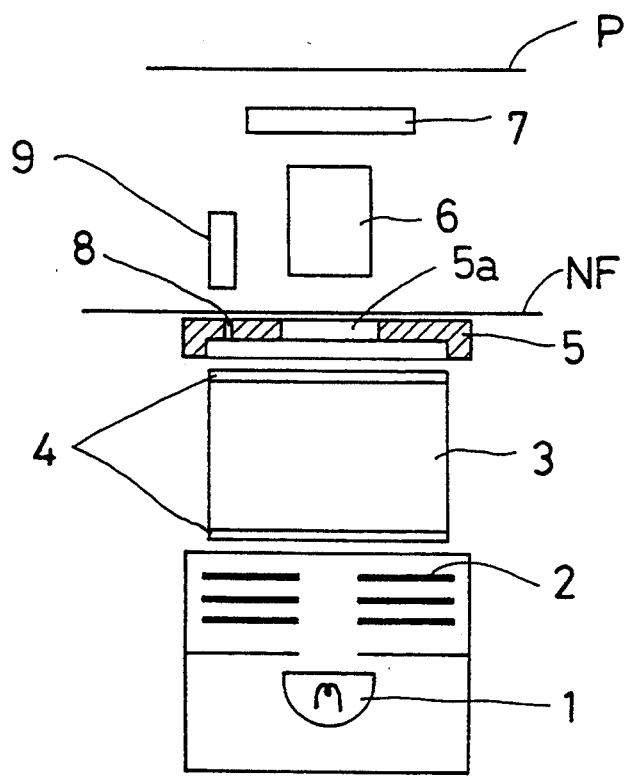
FIGS. 4A and 4B are schematic views of conventional photographic printing apparatus.
Figure 4B:
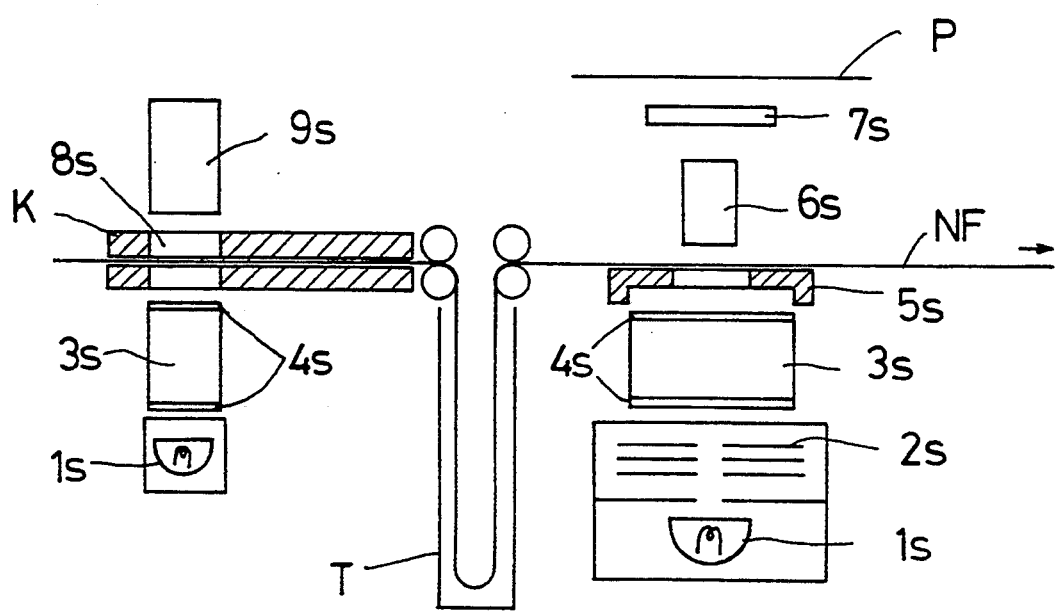

As shown in FIG. 3, the scanner filter 16 comprises a rotary disk driven by a motor 19 and B-, G- and R-filter sections 16B, 16G and 16R mounted On the disk. A filter sensor 20 is provided along the outer periphery of the scanner filter 16 to detect the timing of passage of each filter section. The disk has a cutout 16X for detecting the angular position of the filter 16. The lens 17 is provided to improve the detecting accuracy of the photometric sensor 18.

A loop tank T is provided to adjust the length of the negative film NF being fed but it is not an essential part.

Now we will describe the printing operation carried out by use of the photographic printing apparatus of this embodiment.

The light emitted from the light source 1 is reflected by the reflecting mirror 10 and has its color tone modulated by the light-modulating filters 2. The light then enters through one diffuser 4 into the mirror tunnel 3, where it is diffused and mixed. The diffused and mixed light leaves the mirror tunnel 3 through the other diffuser 4 and is applied to each frame of the negative film NF supported on a negative mask 5, thus irradiating each frame uniformly over the entire surface thereof. The images on the negative films are thus printed on the paper P under the printing conditions determined by the lens 6 and the shutter 7. The operations described above are ordinarily practiced ones.

The light from the light source 1 is divided into a light beam for exposure and a light beam for scanning. Namely, the latter light beam passes through the light-passing portion 11 formed in the reflecting mirror 10 and then through the scanner filter 16 and is received by the photometric sensor 18. Every time the light passes through each of the B, G and R filter sections 16B, 16G and 16R of the scanner filter 16 which is rotating, the timing of passage of light through the respective filter section is detected by the filter sensor 20 so as to measure each component of the light that passes through the respective filter section, with the photometric sensor 18.

By determining the light amount for the components of the light that pass through the respective filter section, it is possible to detect the components of the entire light that passes through the negative film. The printing and exposure conditions are determined and controlled according to the measuring results for the components of the entire light thus detected.

According to this invention, in order to divide the light from the light source 1 into the light for exposure and the light for scanning, the reflecting mirror has a non-reflective portion. The shape and size of the non-reflective portion will have no influence on the amount of light for printing. This is because the light reflected by the reflecting mirror 10 is diffused and mixed while it passes through the diffuser 4 and the mirror tunnel 3 and thus the light is applied to the negative film uniformly over the entire surface thereof.

What is claimed is:

1. A photographic printing apparatus comprising a light source, a filter, a mirror tunnel, a diffuser, a lens, a shutter, and a scanner unit, characterized in that said apparatus further comprises a light reflecting member having a light-passing portion for reflecting part of the light from said light source to pass through said filter, mirror tunnel, diffuser, lens and shutter, the remaining of the light passing through said light reflecting member toward said scanner unit.

2. A photographic printing apparatus as claimed in claim 1 wherein said light-passing portion is a hole formed in said light reflecting member.

3. A reflecting member as claimed in claim 1 wherein said light-passing portion is formed by partially removing or thinning a reflecting film formed on said light reflecting member by vapor deposition.

* * * * *